US007532642B1

(12) United States Patent
Peacock

(10) Patent No.: US 7,532,642 B1
(45) Date of Patent: May 12, 2009

(54) METHODS AND APPARATUS SUPPORTING ADAPTIVE BANDWIDTH MANAGEMENT

(75) Inventor: John Kent Peacock, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 766 days.

(21) Appl. No.: 10/797,989

(22) Filed: Mar. 11, 2004

(51) Int. Cl.
*H04J 3/16* (2006.01)

(52) U.S. Cl. .................. 370/468; 370/477; 370/252

(58) Field of Classification Search .......... 370/235, 370/395.21, 395.4, 395.43, 411–413, 468, 370/477
See application file for complete search history.

(56) References Cited

U.S. PATENT DOCUMENTS

| | | | | |
|---|---|---|---|---|
| 5,884,037 | A * | 3/1999 | Aras et al. ................ | 709/226 |
| 6,208,640 | B1 * | 3/2001 | Spell et al. ............... | 370/358 |
| 6,438,141 | B1 * | 8/2002 | Hanko et al. ............. | 370/477 |
| 6,560,243 | B1 * | 5/2003 | Mogul ...................... | 370/468 |
| 6,947,445 | B1 * | 9/2005 | Barnhart ................... | 370/468 |
| 6,993,044 | B2 * | 1/2006 | McKinnon et al. ........ | 370/468 |
| 6,996,132 | B1 * | 2/2006 | Tolety ...................... | 370/517 |
| 7,027,403 | B2 * | 4/2006 | Porikli et al. ............. | 370/238 |

* cited by examiner

*Primary Examiner*—Ricky Ngo
*Assistant Examiner*—Dady Chery
(74) *Attorney, Agent, or Firm*—Brooks Kushman P.C.

(57) ABSTRACT

A first data communication device (e.g., a thin client) receives data from a second communication device (e.g., a server or central computer) over a network. The first data communication device detects an actual bandwidth associated with receiving data from the second data communication device. Based on an actual detected bandwidth associated with receiving the data, the first data communication device generates a bandwidth metric identifying a proposed data rate for transmitting future data from the second communication device to the first data communication device. The first communication device transmits the bandwidth metric to the second data communication device for future data transmissions. Based on use of this technique, the second communication device transmits at or near a maximum possible bandwidth supported by a network link supporting transmission of data to the first data communication device.

37 Claims, 6 Drawing Sheets

METHODS AND APPARATUS SUPPORTING ADAPTIVE BANDWIDTH MANAGEMENT

BACKGROUND

Thin clients are defined as clients that perform little or no local data processing. Instead of relying on local processing power, thin clients couple through a network to a corresponding central computer that executes applications on behalf of the thin clients. In such applications, the central computer (such as a server) typically generates output streams including audio and video data over a network to the thin client such as a desktop device. The thin clients typically play back the audio data or display the video data as such data is received from the central computer.

Depending on the application, the transmission speed of a network connection between a thin client and the central computer can vary widely such as around 300 kilobits per second on a DSL line to around 100 Mega bits per second in a local area network application. Higher speed network connections enable a thin client to perform higher performance operations assuming that the network connection is a bottleneck rather than the processing capability at the central computer. Because the thin client depends so heavily on throughput of a communication link with the central computer, such links need to be used as efficiently as possible.

Characteristics of data sent to a thin client (e.g., desktop unit) are somewhat different than most network traffic (e.g., files or web pages) which is transmitted in accordance with an acknowledgment based protocol such as TCP/IP (Transmission Control Protocol/Internet Protocol). One potentially significant property associated with file transfers and web page accesses is that all of the data typically must be reliably delivered reliably and correctly ordered to the application attempting to access the data. Even loss of a single byte of data may be unacceptable. The standard Transmission Control Protocol, on top of the Internet Protocol (such as TCP/IP), supports data transmissions with the desirable property that lost data packets are retransmitted until all data is properly received at a receiver. For example, if data is lost during transmission, the TCP protocol causes retransmission of lost data until the sender acknowledges receipt of the data. Delays and throttling mechanisms are sometimes implemented in TCP sending and retransmission algorithms to make efficient use of the available bandwidth and to avoid causing over-congestion in the network.

In a thin client application, time is of the essence. Audio data in a thin client application must be received at the thin client at the right time to drive a corresponding output device such as a speaker. Otherwise, the audio output from the speaker will be of poor quality. Smooth audio output is usually accomplished via use of buffering at the thin client to allow for some time variance of receiving audio packets. Unlike TCP, loss of an audio packet in the network does not cause the sender to retransmit that particular data. This is largely because real-time data received too late in time tends to be useless for playback purposes. Instead, the audio playback at the thin client just continues, perhaps with some audible defect or display as a result of one or more occasional lost packets. An appropriate network protocol for this type of traffic is the User Datagram Protocol (UDP) over the Internet Protocol (IP). UDP provides unreliable transmission of packets, leaving it up to a higher level protocol to recover from lost or mis-ordered packets.

SUMMARY

For certain thin client applications, all or most traffic to a thin client has a similar or same need for timely deliver. For reasons discussed above, retransmission of real-time screen content updates makes no sense because content displayed on a screen may have already changed by the time the thin client finally receives a previously lost data packet. Thin clients sometimes have the ability to determine whether data or commands from the central computer have been lost during transmission. When the central computer is notified of missing commands due to lost packets, the central computer identifies regions of a screen at the thin client to which the missing commands pertain and generates new commands to update those regions with corresponding latest screen content.

Conventional techniques of allocating bandwidth allocation suffer from certain deficiencies. For example, just as UDP has no provisions for re-transmitting lost packets, it also has no mechanism, as TCP does, to avoid transmitting at a rate that could flood the network with excess traffic. Transmitting at too high of a rate can cause network congestion and result in a very poor use of a network link. Thus, it is desirable for a thin client computer system to implement some sort of flow control mechanism to avoid saturating a network with traffic.

Certain central computers (e.g., a SunRay server) can generate screen updates at a maximum rate that is close to 70 megabits per second, which would hopelessly saturate a 300 kilobits per second DSL line. Certain conventional methods include use of a flow control mechanism at the central computer which clamp the output rate of data transmitted from the server to the thin client. Unfortunately, conventional flow control mechanisms typically clamp the bandwidth rate far lower than the network can actually support. Thus, associated network connections are under-utilized even though a user pays a full cost associated with using such a link.

To mitigate this problem and other problems associated with conventional methods, embodiments of the invention provide a better approximation of actual available bandwidth associated with a network or part thereof. When transmitting near or at a rate of the actual available bandwidth, fewer data packets are lost and a client device typically operates closer to its fullest potential. Thus, in such a case, a transmitter (e.g., a server) can be reasonably certain that a receiver (e.g., a thin client) most likely receives the data packets, barring the occurrence of some other system failure.

In one application of the invention, a thin client device (e.g., a Sun Ray desk top unit) incorporates a stateless design for a client based on connecting to a user's session from one of multiple desktop devices. Thus, a same session can be accessed using a 100 Mbps LAN connection of a corporate setting or a 300 Kbps DSL line in a user's home. Depending on the characteristics of the link, software on the central computer quickly detects the availability of bandwidth when a connection is made to a users session and adjusts the bandwidth accordingly. For example, as bandwidth availability increases, the central computer receives a notification to transmit data at a higher data rate. Conversely, as bandwidth availability decreases, the central computer receives a notification to transmit data at a lower data rate.

It is an advancement in the art to enable more efficient communications over a network based on more precisely identifying or calculating a proposed bandwidth for communicating data over a network or part thereof such as a network link as discussed. In a specific embodiment of the invention, a desk top unit such as a thin client measures round trip times of communications between a client such as a desk top unit and a server as well as an actual bandwidth associated with receiving data (e.g., data transmitted according to UDP) from a server over a network. The measured round trip time and actual bandwidth associated with receiving data at the desk top unit may vary over time depending on network congestion. An amount of allocated bandwidth is adjusted accordingly.

Based on these measured characteristics (e.g., round trip time and actual bandwidth of receiving data) over time, the desk top unit or client adjusts an amount of bandwidth allocated to the server for transmitting future data to the desk top device. In one application, this technique of allocating bandwidth includes constantly or repeatedly feeding back bandwidth allocation information (e.g., via a bandwidth grant message) to the server over time. The bandwidth allocation information includes a more accurate assessment of true available bandwidth for transmitting data packets, thus resulting in fewer lost data packets during transmissions from the server to the desk top unit.

Accordingly, in view of the specific embodiment of the invention as discussed above, a general embodiment of the invention involves a technique of adaptively allocating bandwidth based on characteristics of a network link susceptible to congestion. For example, a first data communication device (e.g., a thin client) receives data from a second communication device (e.g., a server or central computer) over a network. The first data communication device detects an actual bandwidth associated with receiving data from the second data communication device. Based on an actual detected bandwidth associated with receiving the data, the first data communication device generates a bandwidth metric identifying a proposed data rate for transmitting future data from the second communication device to the first data communication device. The first communication device transmits the bandwidth metric (e.g., a bandwidth grant message) to the second data communication device for future data transmissions. Based on use of this technique, the second communication device makes more efficient use of a network link supporting transmission of data to the first data communication device.

In further embodiments and yet other independent embodiments of the invention, detecting the actual bandwidth at the first communication device includes receiving data from the second data communication device and measuring a rate of receiving the data from the second communication device. For example, in the context of thin client application, a thin client (i.e., the first communication device) measures how many data bits are received over durations of time such as half second intervals. In one embodiment, receiving the data at the thin client from a server (i.e., the second communication device) includes i) receiving the data in accordance with the proposed data rate identified by a previously generated bandwidth metric, and ii) receiving the data based on use of a non-acknowledgment data transmission protocol (e.g., UDP).

As mentioned, one purpose of receiving the data at the thin client is to control one or more corresponding human interface devices (e.g., displays, speakers, etc.). For example, the server generates multiple streams including audio and video data. The thin client utilizes the data received from the server to drive or control one or more human interface devices (e.g., display screens, speakers, etc.) associated with the thin client.

In another embodiment, the thin client, in addition to measuring a bandwidth associated with receiving the data at the thin client, identifies a round trip time associated with communications between the thin client and corresponding server over a network. The thin client generates the bandwidth metric (e.g., a bandwidth allocation metric identifying an amount of bandwidth to be assigned for use by the server to transmit data to the client) based on the actual measured bandwidth of data received at the thin client as well as the round trip time associated with communications between the thin client and corresponding server. The round trip time measures an amount of elapsed time associated with transmitting the bandwidth metric to the second data communication device and receiving a data packet from the second data communication device. In general, the bandwidth metric represents an appropriate estimate of actual available bandwidth for transmitting future data (transmitted from the server to the client) based on a combination of current and past system conditions.

The bandwidth metric can be generated in response to detecting an event. For example, in one embodiment, the client generates the bandwidth metric in response to receiving a request for bandwidth allocation received from the server. As discussed, the client generates the bandwidth metric based on i) the actual measured bandwidth of receiving data at the client as well as ii) the round trip time associated with communications between the first data communication device and the second data communication device. In other embodiments, the thin client generates one or more bandwidth metrics for each of multiple processes at a server either periodically, randomly, or in response to detecting one or more events.

In a more specific embodiment, generating the bandwidth metric at the thin client includes: calculating the bandwidth metric based at least in part on: i) a current measured round trip time associated with communications between the thin client (i.e., first data communication device) and the server (i.e., second data communication device), ii) a previously measured minimum round trip time associated with communications between the thin client and the server, and iii) and a highest measured actual bandwidth associated with data received from the server during a particular communication session.

As previously discussed, the thin client transmits the bandwidth metric to the server. The server utilizes the metric to identify how fast to transmit data in a reverse direction to the thin client. In one embodiment, in addition to transmitting the bandwidth metric to the server, the thin client provides a unique identifier along with the bandwidth metric for use by the server to tag the future data transmitted from the server to the thin client. Thus, the server, when transmitting data in accordance with a rate specified by the bandwidth metric, tags corresponding data with the unique identifier. Consequently, the thin client receiving the tagged data can identify which bandwidth grant the received data is associated based on the unique tag. In one embodiment, the thin client receives multiple data streams from the server; each of the streams conveys data associated with a corresponding process at the server to the thin client.

Techniques of the invention are well-suited for use in applications in which the speed of a network varies depending on congestion and noise and there is a desire to transmit data over a link at an efficient rate. Packets transmitted over a network connection may be lost at a result of increased noise. Additionally, packets transmitted over a network connection may be lost or delayed as a result of increased congestion. In either circumstance, the effective ability of the network connection to support data communications decreases. Conversely, system conditions such as lower noise and less congestion typically increase the ability of the network connection to support data communications.

According to another embodiment of the invention, a data flow manager at the thin client monitors communications over a network connection and adaptively allocates bandwidth for transmitting data depending on present system conditions. For example, a thin client measures a round trip time associated with communications between the thin client and a corresponding server. Depending on the round trip time, the thin client allocates bandwidth for communications over the network link. If the measured round trip time is below a threshold value, the thin client sets the bandwidth metric to be a higher value than a measured actual bandwidth associated with receiving data at the thin client. If the measured round trip time is below a threshold value, the thin client sets the bandwidth metric to be a higher value than the actual bandwidth. Consequently, the measured round trip time is one indicator of a level of congestion or noise associated with a network connection and whether a rate of future communications can be increased or decreased.

In one embodiment, the thin client generates the bandwidth metric (e.g., bandwidth allocation grant) in response to receiving a request for bandwidth allocation from a server. The thin client may repeatedly receive requests during a communication session. Thus, the process of generating a bandwidth metric repeats during a communication session. This technique of repeatedly updating the bandwidth allocation depending on link conditions ensures that the link is being used more efficiently. In one embodiment, the server maintains one or more processes, each of which generates independent sets of data (e.g., audio data, video data, etc.) for transmission to the thin client. The thin client thus receives multiple bandwidth allocation requests associated with the multiple processes maintained at the server. The processes vie for bandwidth to transmit data to the thin client. In response to receiving the requests, the thin client grants bandwidth, via transmission of multiple bandwidth metrics, to the server for streaming the independent sets of data associated with the multiple processes from the server to the thin client. As discussed above, the thin client also sends a unique identifier to the server along with the bandwidth metric. The server tags each of the data packets transmitted to the client with the unique tag for a corresponding bandwidth allocation metric.

In one application, the thin client measures the round trip time based at least in part on a time difference between transmitting a message to notify the server of the unique identifier and receiving a first data packet from the server including the unique identifier for the given bandwidth grant. Note that the measured round trip time associated with communications between the thin client and the server optionally takes into account (e.g., subtracts out) a time associated with the server receiving the bandwidth metric and generating the first data packet associated with the given bandwidth allocation back to the thin client. For example, a round trip time can take into account a time between the server i) receiving a communication (e.g., a bandwidth grant message) from the thin client and ii) transmitting a communication to the thin client. Thus, this measurement of round trip time more accurately reflects the ability of a communication link to convey information without being effected by a latency associated with the server receiving the bandwidth metric and generating a data packet back to the thin client. In a specific embodiment, generating the bandwidth metric at a thin client includes generating the bandwidth metric based on a formula as follows:

$$\text{bandwidth metric} = \frac{(currRTT + minRTT + MSDELAY) * avgbw}{(2 * currRTT)},$$

wherein currRTT=a current measured round trip time associated with communications between the first data communication device and the second data communication device;

wherein minRTT=a previously measured minimum round trip time associated with communications between the first data communication device and the second data communication device during a communication session;

wherein avgbw=a highest previously measured actual bandwidth associated with data received from the second data communication device; and wherein MSDELAY=C+n*minRTT, where C is a constant such as 100 milliseconds and n is an integer greater than or equal to zero. Thus, MSDELAY may be a constant or be a function of another system parameter.

As discussed, embodiments of the invention are well-suited for use in thin client computer applications such as those that depend on a central computer such as a server to provide data processing capability at a remote location with respect to a user. Additionally, use of the aforementioned and following techniques are particularly well-suited for network systems that support disseminating data according to a non-acknowledgment protocol such as UDP. Use of the non-acknowledgment protocol reduces an amount of overhead otherwise incurred when using a positive acknowledgment communication protocol such as a TCP/IP. However, it should be noted that embodiments of the invention are not limited to use in non-acknowledgment applications and thus embodiments of the invention are well suited for other applications as well.

Other embodiments of the invention include a computer system, such as a data communications device (e.g., a fat client, a thin client, a desk top computing device, etc.), computerized device, or other device configured with software and/or circuitry to process and perform all (or a portion thereof) of the method operations noted above and disclosed herein as embodiments of the invention. In such embodiments, the device, such as a data communications device, comprises one or more communications interfaces (e.g., network interfaces), a memory (e.g., any type of computer readable medium, storage or memory system), a processor and an interconnect mechanism connecting the communications interface, the processor and the memory. In such embodiments, the memory system is encoded with an application that causes the computer system to perform any part and/or all of the method embodiments, steps and operations explained herein as embodiments of the invention. In other words, a computer or other electronic circuit device programmed or configured to operate as explained herein is considered an embodiment of the invention.

One embodiment of the present invention is directed to a computer program product that includes a computer readable medium having instructions stored thereon for adaptively managing allocation of bandwidth. The instructions, when carried out by a processor of the first data communication device, cause the processor to perform the steps of: i) detecting an actual bandwidth associated with receiving data from the second data communication device, ii) generating a bandwidth metric based on the actual bandwidth associated with receiving the data, the bandwidth metric identifying a proposed data rate for transmitting future data from the second communication device to the first data communication device, and iii) transmitting the bandwidth metric to the second data communication device. Other arrangements of embodiments of the invention that are disclosed herein include software programs to perform any of the method embodiment steps and operations summarized above and disclosed in detail below.

Embodiments of the invention may be implemented by computer software and/or hardware mechanisms within any type of computing apparatus. It is to be understood that the certain embodiments of the invention can be embodied strictly as a software program, as software and hardware, or as hardware and/or circuitry alone. The features of the invention, as explained herein, may be employed in data communications devices, computerized devices and/or software systems for such devices such as those manufactured by Sun Microsystems, Inc. of Santa Clara, Calif.

Figure 1:
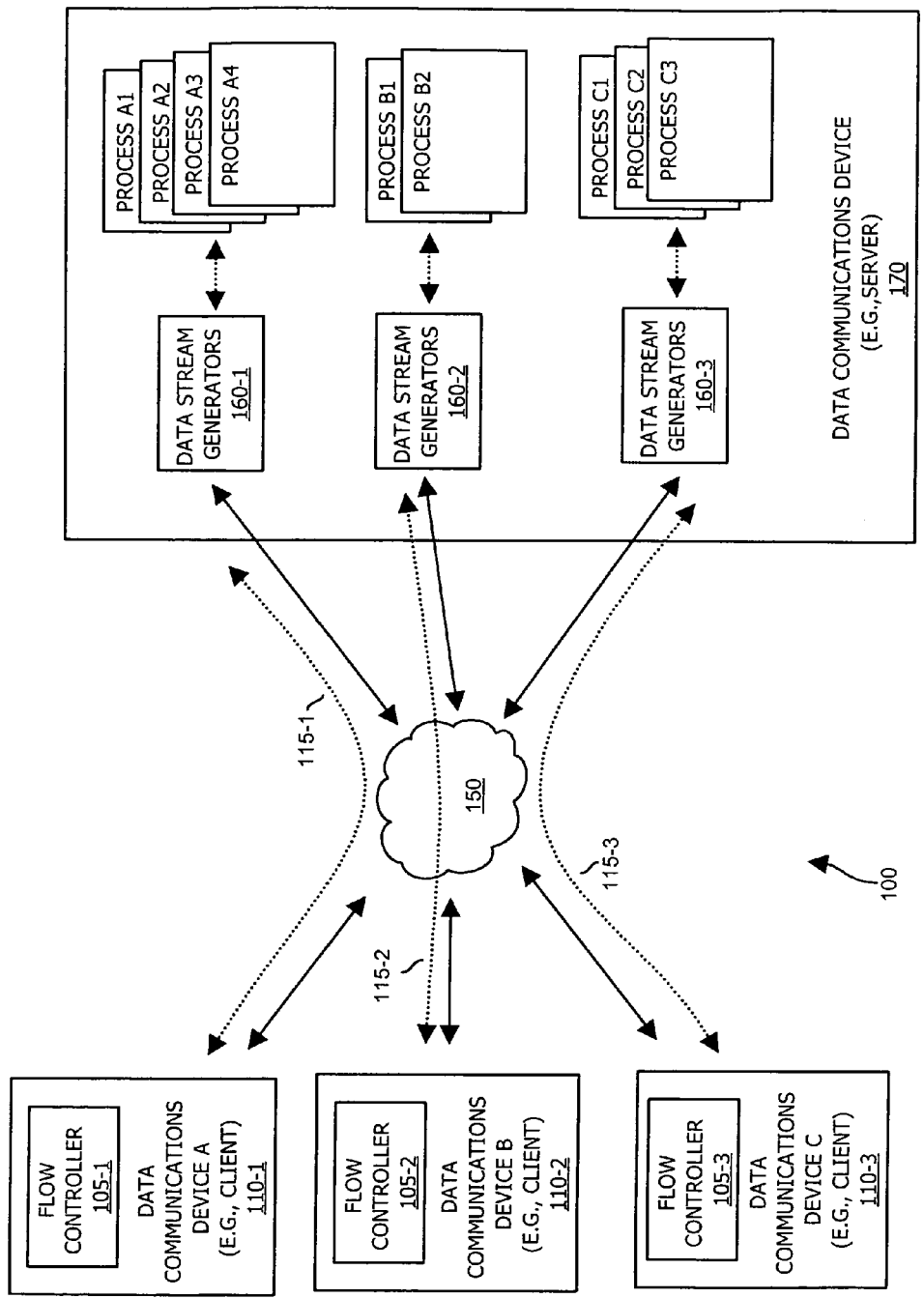
FIG. 1 is a system block diagram of a communication system supporting bandwidth management and allocation according to an embodiment of the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF EMBODIMENTS

According to an embodiment of the invention, a first data communication device (e.g., a thin client) receives data from a second communication device (e.g., a server or central computer) over a network. The first data communication device detects an actual bandwidth associated with receiving data from the second data communication device. Based on an detected actual bandwidth associated with receiving the data, the first data communication device generates a bandwidth metric identifying a proposed data rate for transmitting future data from the second communication device to the first data communication device. The first communication device transmits the bandwidth metric to the second data communication device for future data transmissions. Based on use of this technique, the second communication device transmits at or near a maximum possible bandwidth supported by a network link supporting transmission of data to the first data communication device.

FIG. 1 is a block diagram of communication system 100 according to an embodiment of the invention. As shown, communication system 100 includes data communications device 110-1, data communications device 110-2, and data communications device 110-3 (collectively, data communications devices 110), network 150, and data communications device 170. Data communications devices 110 include respective flow controller 105-1, flow controller 105-2, and flow controller 105-3 (collectively, flow controllers 105). Data communications device 170 includes respective data stream generators 160-1, data stream generators 160-2, and data stream generators 160-3 to serve data associated with processes A, B, and C to corresponding data communications devices 110. For purposes of the following discussion of FIG. 1, data communications devices 110 shall be referred to as clients 110. Data communications device 170 shall be referred to as server 170.

In general, respective flow controllers 105 associated with clients 110 monitor data streams 115 received from server 170. The flow controllers 105 provide server 170 and, more particularly, data steam generators 160 bandwidth metrics (e.g., bandwidth allocation information) indicating a rate at which respective data stream generators 160 shall transmit future data associated with respective processes A, B and C from server 170 to clients 110.

Each process (e.g., such as process A1, process A2, process A3, and process A4 associated with client A) may be allocated a different amount of bandwidth for transmitting data to a corresponding client 110. For example, flow controller 105-1 may determine, based on present and past system conditions, that network 150 (or corresponding network connection thereof associated with data stream 115-1) supports a particular bandwidth for receiving data from server 170. Flow controller 105-1 assigns each of processes A1, A2, A3, and A4 usage of an available overall bandwidth depending on priority. For example, a link between server 170 and client 110-1 may support 50 megabits per second of cumulative bandwidth. The flow controller 105 may allocate 10 megabits per second for process A1 to transmit data to client 110-1, 10 megabits per second for process A2 to transmit data to client 110-1, 30 megabits per second for process A3 to transmit data to client 110-1, and 0 megabits per second for process A1 to transmit data to client 110-1. The amount of allocated bandwidth changes over time depending on system conditions. Data stream generators 160 transmit data in accordance with a rate proposed by the corresponding flow controller 105-1. Thus, in a nutshell, processes at server 170 transmit bandwidth request messages indicating a present need for the process to transmit data to clients 110. Respective flow controllers 115 allocate data based on the successive requests for bandwidth.

In one embodiment, clients 110 are thin clients that rely on server 170 to do a majority of application and data processing. Processes A1, A2, A3, and A4 are associated with client 110-1, processes B1, and B2 are associated with client 110-2, and processes C1, C2, and C3 are associated with client 110-3. Clients 110 receive data associated with processes at server 170 via data streams 115 to drive output devices such as displays, speakers, headphones, etc. For example, client 110-1 is a thin client that receives data generated by processes A1, A2, A3, and A4 via data stream 115-1. Data from processes at server 170 may include information played back substantially in real-time.

In a reverse direction, clients 110 communicate with respective processes at server 170 via data streams 115. Flow of data from clients 110 to server 170 includes data provided by a user such as keyboard input information, mouse movement information, files, etc. Thus, data processing functions at server 170 provide processing functions otherwise provided at a local terminal such as a personal computer system. Offloading the processes to the server 170 rather than bounding them to a local host computer enables multiple users to share use of common terminal devices. In other words, processes supported at server 170 may be accessed from multiple different terminal sites over network 150.

In one embodiment, each user associated with communication system 100 is assigned a portable circuit card that plugs into a desktop unit such as a client 110. The portable card identifies the corresponding user such that, when the portable card is plugged into a terminal device, a user may access her applications and corresponding processes at server 170. The user may logoff one terminal device (e.g., client 110-1) and reconnect via another terminal device (e.g., client 110-2) without losing any state information associated with corresponding user processes. In other words, server 170 optionally maintains processes A1, A2, A3, A4 so that a corresponding user may access them from different thin client terminals throughout a working day.

Conventional methods of communicating data include transmitting data via use of TCP. TCP utilizes a concept of a congestion window to control a flow of data, which means that only a certain amount of data are allowed to be sent from a transmitting device without being acknowledged by a receiver. One disadvantage associated with this conventional technique is that data transmissions on a TCP connection may, at times, be halted altogether. Reducing a rate of transmitting traffic to zero is undesirable in certain circumstances, especially for thin client applications that rely heavily on receiving streams of data from a server.

In communication system 100 according to an embodiment of the invention, at any given time, there are specified transmission rates in force. For example, flow controllers 105 at clients 110 (e.g., thin desktop computers) determine the allocated rate of transmitting data from server 170 using measurements of the maximum rate at which data have been received, and a measured RTT (Round Trip Time) associated with communications between a client 110 and server 170. As discussed, flow controllers 105 estimate the real bandwidth available for receiving data from server 170. In response, flow controllers 105 allocate use of the available bandwidth to competing services (e.g., processes A1, A2, A3, A4, etc.) for each connection.

According to an embodiment of the invention, at any given time, clients 110 and, more specifically, flow controllers 105 maintain sets of parameters (e.g., variables) to adaptively change bandwidth allocation depending on system conditions. The parameters include:

| | |
|---|---|
| currRTT | which is a minimum of currently measured RTTs associated with a client and each of the corresponding competing processes (e.g., processes A1, A2, A3, and A4) transmitting data from the server 170 to corresponding client 110 |
| minRTT | which is a minimum currRTT detected during a particular user communication session |
| avgbw | which is an estimate of the true available bandwidth which, in one application, involves measuring a rate of receiving data at a given client 110 |
| bwlimit | which is a total identified available bandwidth for allocation among corresponding processes (e.g., process A1, A2, A3, and A4) associated with a client 110 |

Figure 2:
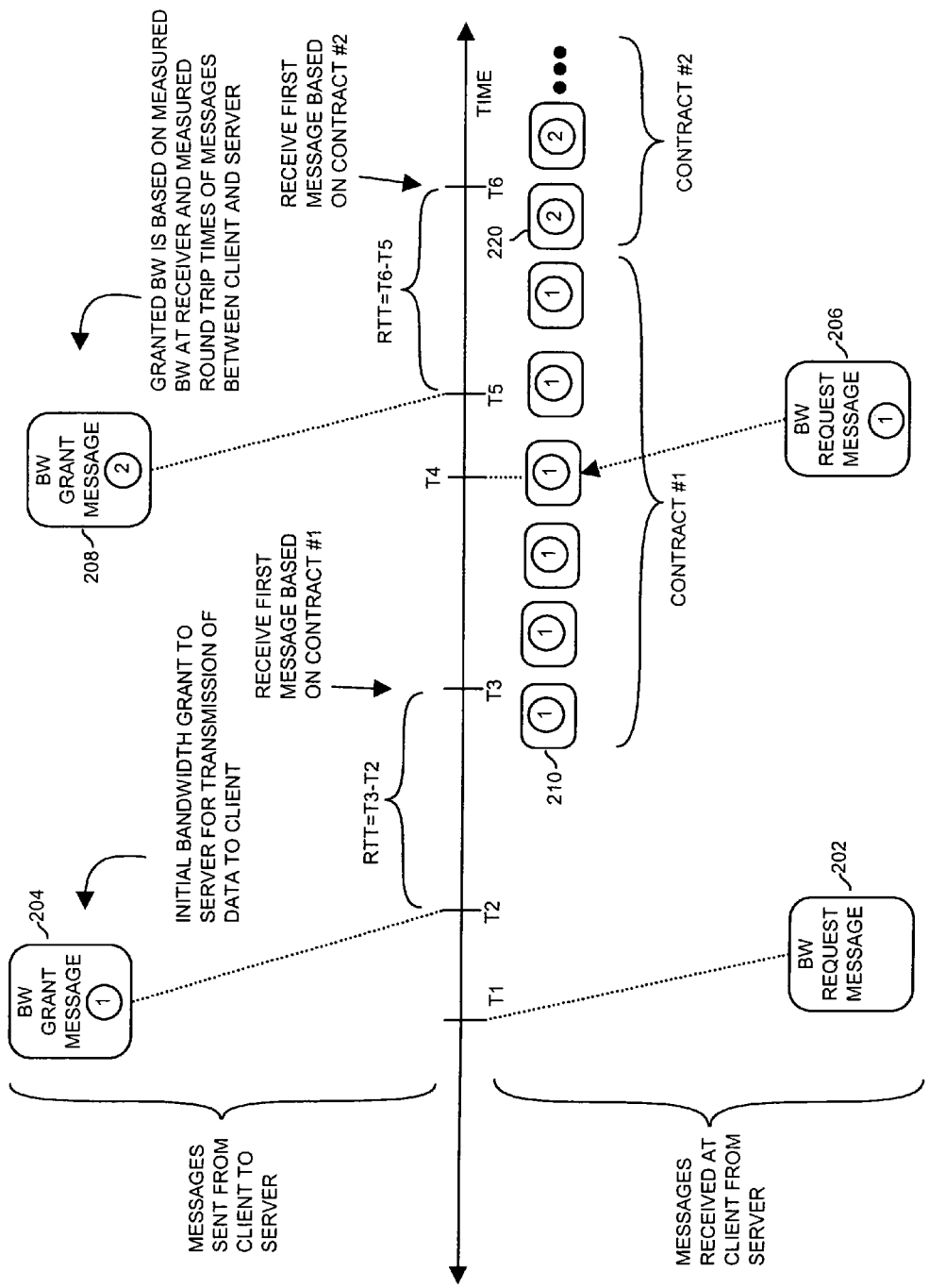
FIG. 2 is a diagram illustrating allocation of bandwidth according to an embodiment of the invention.

In one embodiment, the method of computing RTT (Round Trip Time) involves identifying a time associated with transmitting a communication from a client 110-1 to server 170 plus a time associated with transmitting a communication from server 170 to client 110-1. For example, flow controller 105 measures RTT based upon a time between sending a bandwidth grant message (e.g., a bandwidth metric indicating a proposed rate of sending data) to server 170 and receiving a message from server 170. In one embodiment, the bandwidth grant message includes a contract number (e.g., a unique identifier) associated with the bandwidth allocation. Upon implementing a new contract and bandwidth allocation grant, the server 170 tags messages associated with the contract grant or bandwidth allocation grant with the unique identifier. Thus, in one embodiment, the flow controller 105-1 measures RTT based on an elapsed time between sending a new contract number and detecting a first data packet including the unique identifier associated with the newly assigned contract, less any time delay associated with the server 170 replying to a new bandwidth allocation grant. For example, a round trip time can take into account a time between the server 170 i) receiving a communication from the client 110-1 and ii) transmitting a communication, in response to receiving the communication, to the client 110-1. In other words, an accurate RTT measurement measures a time associated with transmitting a communication from a client 110-1 to server 170 plus a time associated with transmitting a communication from server 170 to client 110-1. The technique of measuring RTT is illustrated in FIG. 2, which will be discussed in more detail later in the specification.

Flow controllers 105 set the avgbw parameter for a particular client session to the highest average bandwidth associated with data received at a client 110 from server 170 as detected during specified intervals such as half second time intervals. The avgbw parameter represents a best estimate of the true available bandwidth for receiving data from server 170 on a particular network link. Note that the flow controller 105 adjusts a value of the avgbw parameter depending on an amount of lost data packets. For example, flow controller 105 adjusts the avgbw parameter downward whenever a corresponding client 110 detects multiple lost packets during a given half second measurement interval. The adjustment downward may be a fraction (such as ⅛) of the currently measured bandwidth. Additionally, a respective flow controller 105 sets the avgbw parameter to a currently measured bandwidth of receiving data if the currRTT parameter becomes unusually high, currently minRTT+500 msec.

Flow controllers 105 compute the bandwidth metric, bwlimit, as a function of the three variables, namely currRTT, minRTT, and MSDELAY. MSDELAY is a constant as discussed below. A newly generated value of the bwlimit parameter may be set to a value significantly higher or lower than avgbw depending on a value of the currRTT parameter. In other words, an amount of bandwidth granted for use by the server 170 to transmit data to a respective client 110 depends on a recently measured RTT of communications between the client 110 and server 170. In one embodiment, the formula for bwlimit is as follows:

$$b\text{wlimit} = (\text{curr}RTT + \text{min}RTT + M\text{SDELAY}) * \text{avg}bw / (2 * \text{curr}RTT)$$

where MSDELAY is a target acceptable value of RTT above minRTT. In one embodiment, MSDELAY (e.g., millisecond delay) is a function (e.g., not necessarily a liner function) of minRTT. For example, flow controller 105-1 sets MSDELAY to 100 msec which is approximately n times a lowest value of the minRTT parameter (e.g., when measured to be 20 mS), and where n=5. In another embodiment, MSDELAY is a function of the maximum or average value of currRTT over some time period. In another embodiment, MSDELAY=C+ n*minRTT, where C is a constant (e.g., 100 milliseconds) and n is an integer greater than or equal to zero. Thus, MSDELAY may be a constant (e.g., when n=0) or a function of another parameter (e.g., minRTT) depending on the application.

In general, the flow controller 105 increases an amount of bandwidth allocation when currRTT is relatively low, and decreases an amount of bandwidth allocation when currRTT is relatively high. The advantage of this technique is that when the avgbw estimate is lower than the true bandwidth available, the bandwidth granted is large enough to allow the sampled avgbw to increase rapidly to a more accurate estimate of actual available bandwidth on a link. To get a sense of how currRTT effects bandwidth allocation, see Table 1 below illustrating bwlimit/avgbw vs. currRTT (in which system conditions include minRTT=25 mS and MSDELAY=100 mS).

In general, Table 1 illustrates underpinnings of a feedback control algorithm for efficient use of available bandwidth on a link monitored by flow controller 105 between the server 170 and client 110. When currRTT for a recently measured RTT is above a threshold value, T, flow controller 105 allocates proportionally less bandwidth than the detected avgbw for the server 170 to transmit data to a respective client 110. Conversely, when currRTT for a recently measured RTT is below a threshold value, T, flow controller 105 allocates proportionally more bandwidth than the avgbw for the server 170 to transmit data to a respective client 110.

TABLE 1

| currRTT (mS) | bwlimit/avgbw |
|---|---|
| 25 | 3.000 |
| 50 | 1.750 |
| 75 | 1.333 |
| 100 | 1.125 |
| 125 | 1.000 ← threshold value, T |
| 250 | 0.750 |
| 500 | 0.625 |
| 750 | 0.583 |

Notice that bwlimit=avgbw when currRTT=minRTT+MSDELAY. In one embodiment, flow controller 105 utilizes the estimated bandwidth at our target currRTT of 125 mS. In other words, if currRTT=125 mS, then flow controller 105 sets bwlimit equal to avgbw. Note that as RTT latency increases, the bwlimit approaches avgbw/2.

Based on the foregoing discussion, one aspect of the invention involves granting bandwidth for a data stream 115 (e.g., a non-acknowledgment data stream such as UDP packet stream) based on actually measured bandwidth as measured at a receiver (e.g., a client). An amount of newly allocated bandwidth depends on measured values of RTT over time as well as actually measured bandwidth. This technique allows for an efficient use of available bandwidth with almost no packet loss and without overhead associated with use of positive acknowledgments type communication protocols.

FIG. 2 is a diagram more particularly illustrating a technique of adaptively managing bandwidth according to an embodiment of the invention. For illustrative purposes, the following discussion involves an adaptive bandwidth control algorithm associated with data streams 115-1 between client 110-1 and server 170. Other flow controllers 105 operate in a similar fashion.

As shown, client 110-1 receives an initial bandwidth request message 202 from a particular process (such as process A1, A2, A3, or A4) at time T1. In response to receiving initial bandwidth request message 202, client 110-1 generates an initial bandwidth allocation value for server 170 to transmit data to client 110-1. Client 110-1 includes a unique identifier such as #1 (e.g., a number uniquely identifying a bandwidth grant cycle) with the bandwidth grant message 204 along with the bandwidth allocation value, the latter of which identifies a proposed allocation of bandwidth for server 170 to transmit data to client 110-1. Initial allocation may be on a lower end of a range that a link (between server 170 and client 110-1) is expected to be able to operate.

At the time of sending the initial bandwidth grant message 204, flow controller 105-1 at client 110-1 starts a timer. Upon receipt of the first data packet 210 associated with contract #1, flow controller 105-1 stops the timer. Thus, the timer measures an elapsed time between sending the bandwidth grant message 204 from client 110-1 and receiving first data packet 210 from sever 170. The elapsed time is a rough measurement of a round trip time, RTT, of communications between the client 110-1 and server 170 to be used in future bandwidth metric calculations. Note, as discussed herein, first data packet 210 associated with contract #1 optionally includes a time delay value, TD1, identifying an elapsed time (and as measured by a timer at server 170) between the server 170 receiving the bandwidth grant message 204 and a time of server 170 transmitting the first data packet 210 to client 110-1. Thus, flow controller 105-1 may detect RTT as T3−T2−TD1. This latter calculation is a more accurate estimate of RTT because it includes a correction for latency associated with server 170. As shown, server transmits a steam of data messages for contract #1. Each message includes the unique identifier associated with contract #1.

At time T4, client 110-1 receives bandwidth request message 206 from an associated process (such as process A1, A2, A3, or A4) during contract #1. In response to receiving bandwidth request message 206, client 110-1 generates bandwidth metric bwlimit as discussed above in relation to FIG. 1 for contract #2. For example, client 110-1 includes a unique identifier such as #2 with the bandwidth grant message 208 along with the newly calculated bandwidth metric, bwlimit. Flow controller 105-1 generates bandwidth metric bwlimit as previously discussed.

At the time of sending bandwidth grant message 208, flow controller 105-1 of client 110-1 starts a timer. Upon receipt of the first data packet 220 associated with contract #2, flow controller 105-1 stops the timer. The elapsed time (e.g., T6−T5) is a rough measurement of a round trip time, RTT, of communications between the client 110-1 and server 170 to be used in future bandwidth metric calculations. Note, as discussed herein, first data packet 220 associated with contract #2 includes a time delay, TD2, encoded in data packet 220. The delay time TD2 identifies an elapsed time between the server 170 receiving the bandwidth grant message 208 and a time of server 170 transmitting the first data packet 220 to client 110-1. Thus, for this interval, time flow controller 105-1 measures RTT as T6−T5−TD2. Flow controller 105-1 repeats this process of generating a bandwidth grant message over a communication session so that server 170 transmits data depending on recent link conditions. For example, as RTT decreases, flow controller 105-1 allocates more bandwidth to server 170 for transmitting data to client 110-1 and vice versa.

Techniques of the invention are well-suited for use in applications in which the speed of a network 150 varies depending on congestion and noise and there exists a desire to transmit data over a link at an efficient rate. Packets transmitted over a network connection may be lost as a result of increased noise. Additionally, packets transmitted over a network connection may be lost as a result of increased congestion. In either of the foregoing cases, the effective ability of the network connection to support data communications from data communications device 110 to data communications device 170 decreases. Conversely, system conditions such as lower noise and less congestion in network 150 typically increase the effective ability of the network connection to support data communications.

As discussed, data flow controller 105 at client 110-1 monitors communications over network 150 and adaptively allocates bandwidth for transmitting data depending on present system conditions. For example, a client 110-1 measures a round trip time associated with communications between the client 110-1 and a corresponding server 170. Depending on the round trip time, the client 110-1 allocates bandwidth for communications over the network 150. If the measured round trip time is below a threshold value, T, the client 110-1 sets the bandwidth metric to be a higher value than a measurement of the actual bandwidth, avgbw, associated with receiving data at the client 110-1. If the measured round trip time is below a threshold value, T, the client 110-1 sets the bandwidth metric to be a higher value than the actual bandwidth, avgbw. Consequently, the measured round trip time is one indicator of a level of congestion or noise associated with a network connection and is used to determine how to allocate bandwidth.

In one embodiment, the server maintains one or more processes, each of which generates independent sets of data (e.g., audio data, video data, etc. associated with respective processes A1, A2, A3, and A4) for transmission to client 110-1. In this embodiment, the client 110-1 receives multiple bandwidth allocation requests associated with the multiple processes maintained at the server 170. For example, the processes at server 170 vie for bandwidth to transmit data to client 110-1. In response to the requests, the client 110-1 grants bandwidth, via transmission of multiple bandwidth metrics, to the server 170 for streaming the independent sets of data associated with the multiple processes from the server 170 to the client 110-1.

Figure 3:
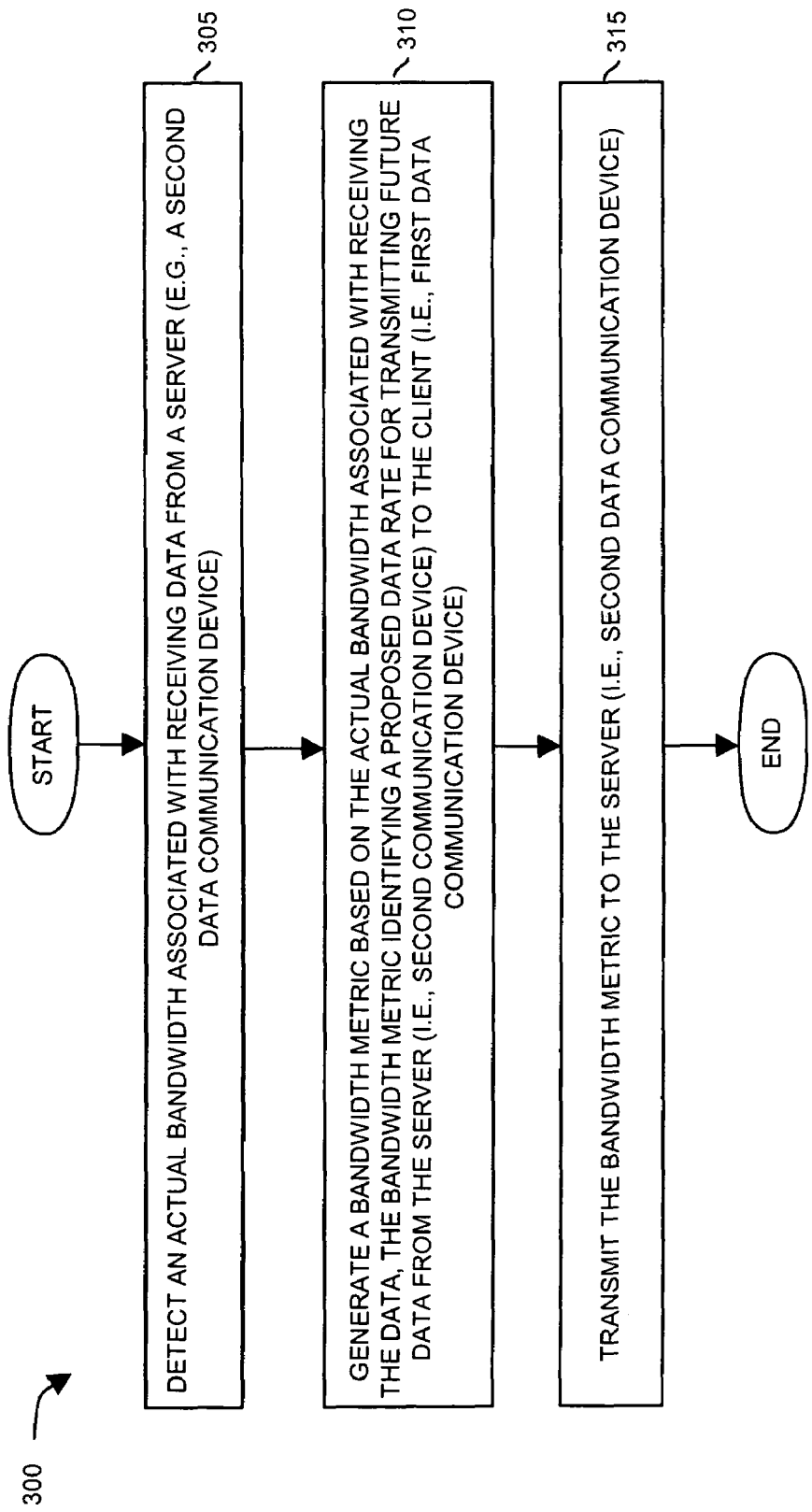
FIG. 3 is a flowchart 300 illustrating a technique of adjusting bandwidth allocation according to an embodiment of the invention.

FIG. 3 is a flowchart 300 illustrating a technique of adaptively managing bandwidth according to an embodiment of the invention.

In step 305, data communication device 110-1 (e.g., a thin client) detects an actual bandwidth associated with receiving data from the second data communication device 170. For example, data communications device 110-1 measures how many bits are received from data communications device 170 in a half second time interval.

In step 310, data communication device 110-1 generates a bandwidth metric, bwlimit, based on the actual bandwidth associated with receiving data in step 305. The bandwidth metric identifies a proposed data rate for transmitting future data from the second communication device to the first data communication device.

In step 315, data communication device 110-1 transmits the bandwidth metric, bwlimit, to the second data communication device for future data transmissions from data communications device 170 to data communications device 110-1. Based on use of this technique, data communication device 170 makes more efficient use of a network link supporting transmission of data to data communication device 110-1.

Figure 4:
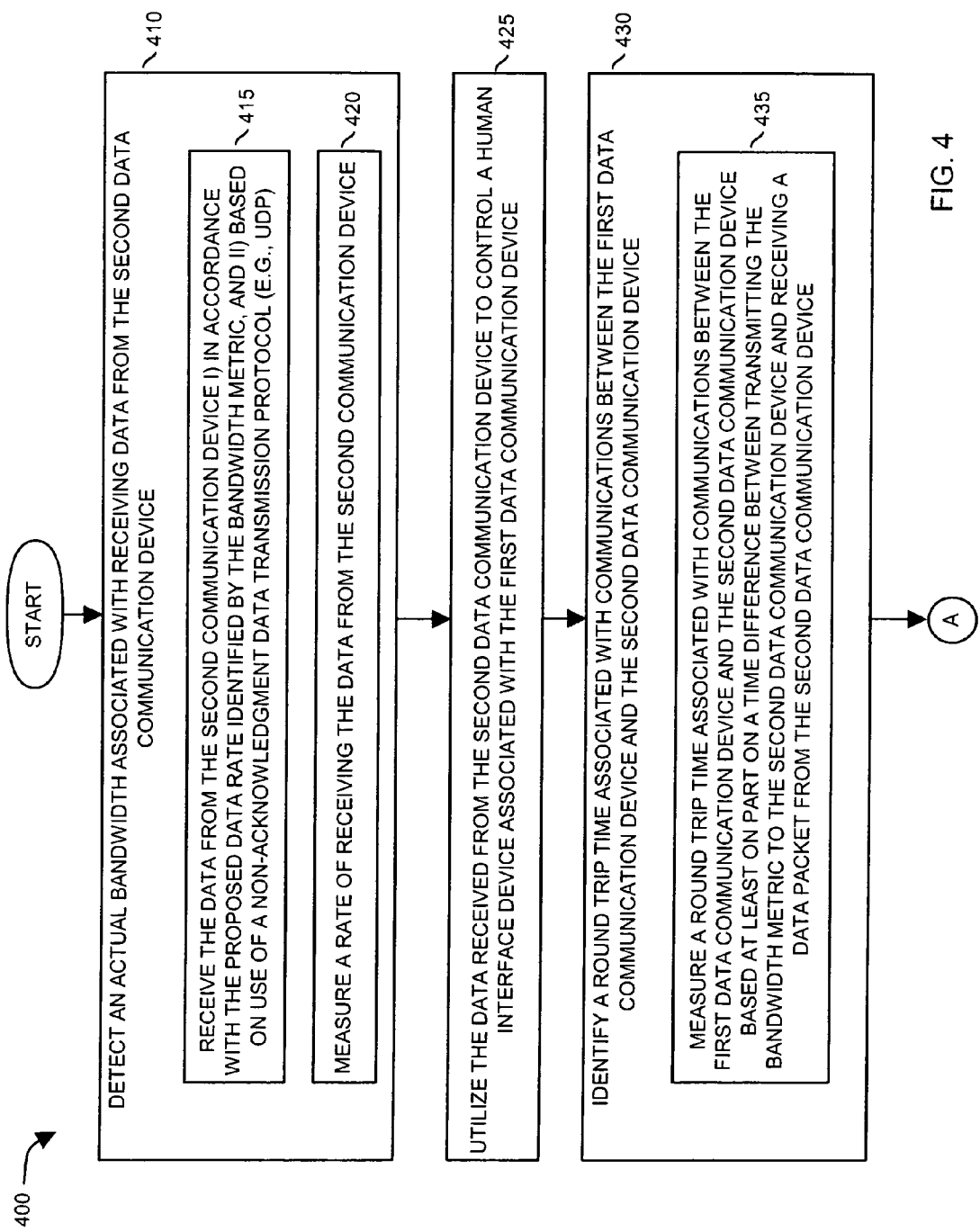
FIGS. 4 and 5 combine to form a flowchart illustrating functionality of flow controllers according to an embodiment of the invention.
Figure 5:
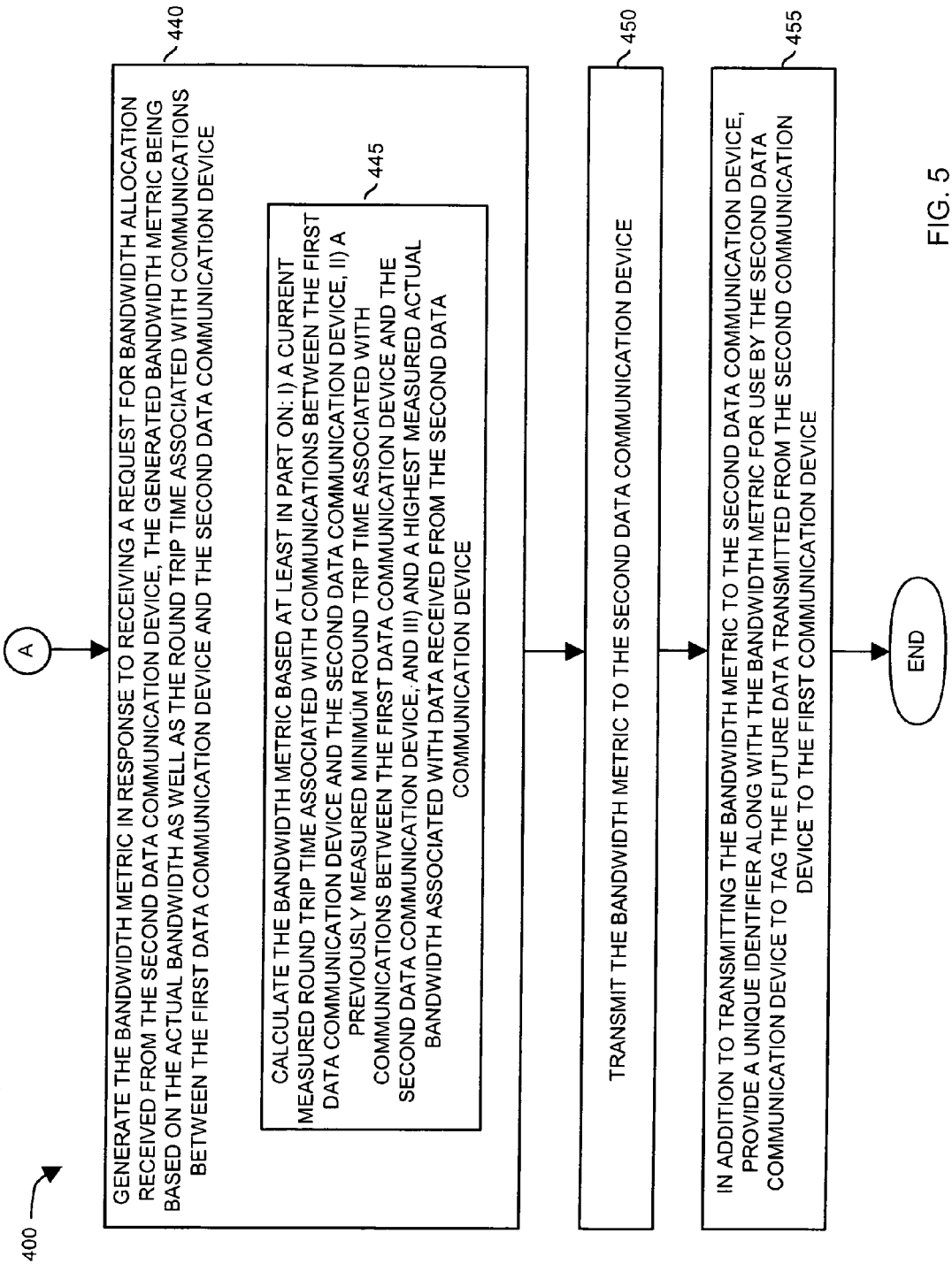

FIGS. 4 and 5 combine to form a flowchart 400 more particularly illustrating functionality of flow controllers 105 according to an embodiment of the invention.

Referring now to FIG. 4, in step 410, data communication device 110-1 detects the actual bandwidth associated with receiving data from data communication device 170 through network 150.

In substep 415, data communication device 110-1 receives data from the data communication device 170. As shown, receiving the data at data communications device 110-1 from data communication device 170 includes i) receiving the data in accordance with the proposed data rate identified by the bandwidth metric, and ii) receiving the data based on use of a non-acknowledgment data transmission protocol such as UDP (User Datagram Protocol).

In substep 420, data communications device 110-1 measures a rate of receiving the data from data communication device 170. For example, in the context of thin client application, a thin client (i.e., the first communication device) measures how many data bits are received in a specified time duration.

In step 425, data communications device 110-1 utilizes the data received from data communications device 170 to control one or more human interface devices (e.g., speakers, displays, etc.). For example, data communications device 170 generates multiple data streams 115 including audio and video data. Data communications device 110-1 utilizes the data received from data communications device 170 to drive or control one or more human interface devices associated with the thin client.

In step 430, data communications device 110-1, in addition to measuring a bandwidth associated with receiving the data at data communications device 110-1, identifies a round trip time, RTT, associated with communications between data communications device 110-1 and corresponding data communications device 170 over network 150. Data communications device 110-1 generates the bandwidth metric, bwlimit, (e.g. a bandwidth allocation metric identifying an amount of bandwidth to be assigned for use by data communications device 170 to transmit data to the client) based on the actual measured bandwidth of data received at data communications device 110-1 as well as the round trip time associated with communications between data communications device 110-1 and corresponding data communications device 170. The round trip measures an amount of elapsed time associated with transmitting the bandwidth metric, bwlimit, to data communications device 170 and receiving a data packet from the data communication device 170. In general, the bandwidth metric represents an appropriate estimate of actual available bandwidth for transmitting future data (transmitted from the server to the client) based on a combination of current and past system conditions.

Referring now to FIG. 5, in step 440, data communications device 110-1 generates the bandwidth metric, bwlimit, in response to receiving a request for bandwidth allocation from data communications device 170. Data communications device 170 generates the bandwidth metric based on i) the actual measured bandwidth of receiving data at data communications device 110-1 as well as ii) the round trip time associated with communications between the data communication device 110-1 and the data communication device 170. In other embodiments, data communications device 110-1 generates the bandwidth metric periodically, randomly, or in response to detecting one or more events.

In substep 445, generating the bandwidth metric at data communications device 110-1 includes: calculating the bandwidth metric, bwlimit, based at least in part on: i) a current measured round trip time RTT associated with communications between data communication device 110-1 and data communication device 170, ii) a previously measured minimum round trip time associated with communications between the thin client and the server, and iii) and a highest measured actual bandwidth associated with data received from the server.

In step 450, data communications device 110-1 transmits the bandwidth metric, bwlimit, to data communications device 170. Data communications device 170 utilizes the bandwidth allocation metric to identify a rate for transmitting data in a reverse direction to data communications device 110-1.

In step 455, in addition to transmitting the bandwidth metric, bwlimit, to data communications device 170, data communications device 110-1 provides a unique identifier along with the bandwidth metric for use by data communications device 170 to tag the future data transmitted from data communications device 170 to data communications device 110-1. Thus, data communications device 170, when transmitting data in accordance with a rate specified by the bandwidth metric, tags data with the unique identifier. Consequently, data communications device 110-1 receiving the tagged data can identify which bandwidth grant the received data is associated based on the unique tag in the received data packets.

Figure 6:
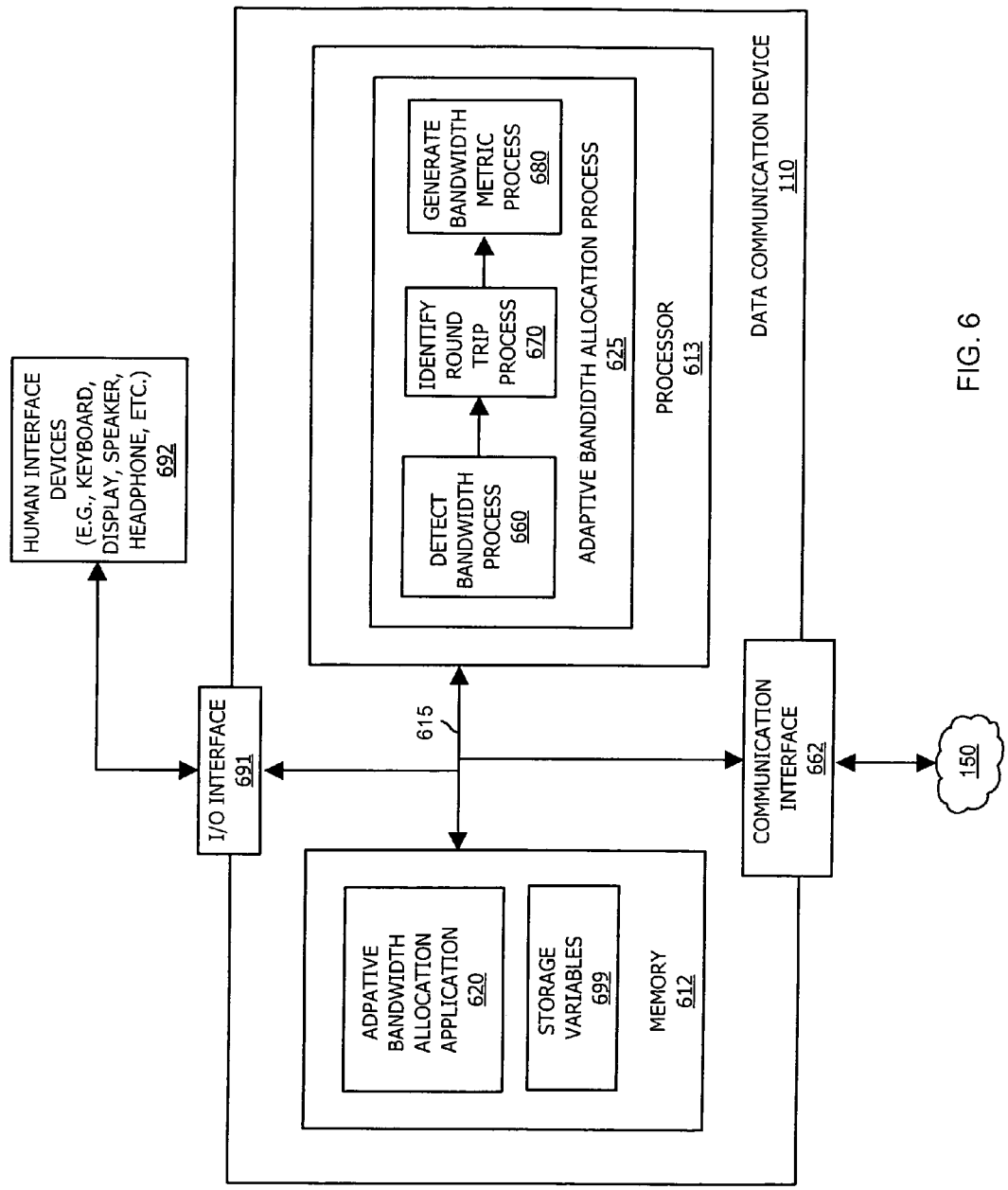
FIG. 6 is a block diagram of a suitable device for executing the flowcharts in FIGS. 3, 4, and 5 according to an embodiment of the invention.

FIG. 6 is a block diagram of a hardware platform suitable for executing algorithms supported by data communications devices 110 and data communications device 1 to according to an embodiment of the invention. According to one arrangement, data communications devices 110 and 170 are a computerized type of devices including interconnect 615 such as a data bus or other circuitry interconnecting memory 612, processor 613, and communication interface 662. Processor 613 may be any type of central processing unit, microprocessor, processing device, controller of other electronic circuitry capable of accessing adaptive bandwidth allocation application 620 to execute, run, interpret, or otherwise adaptive bandwidth allocation application 620 to process and forward messages according to embodiments of the invention as explained herein. In other words, adaptive bandwidth allocation application 620 may be embodied as one or multiple software programs that enable data communications devices 110 to adaptively allocate bandwidth depending on throughput quality of a network link as discussed.

Memory 612 stores adaptive bandwidth allocation application 620 as well as storage variables 699 (e.g., values for currRTT, minRTT, bwlimit, avgbw, etc.). In general, adaptive bandwidth allocation application 620 in memory 612 represents software code, data and/or logic instructions executed by processor 613. When such code is executed, processor 613 creates adaptive bandwidth allocation process 625 including detect bandwidth process 660, identify round trip time process 670, and generate bandwidth metric process 680.

In another arrangement, data communications devices 110 and 170 implement algorithms and related functions via a set of specially programmed integrated circuits (ICs) (e.g., Field-Programmable Gate Arrays, Application Specific ICs, etc.). In yet another arrangement, data communications devices 110 and 170 include a combination of programmable ICs and processor 613 to support the techniques of the present invention.

As discussed, embodiments of the invention are well-suited for use in thin client computer applications such as those that depend on a central computer such as a server to provide data processing capability at a remote location with respect to a user. Additionally, use of the aforementioned and following techniques are particularly well-suited for network systems that support disseminating data according to a non-acknowledgment protocol such as UDP. However, it should be noted that embodiments of the invention are not limited to such applications and embodiments of the invention extend to uses in other applications as well.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a first data communication device that receives data from a second data communication device over a network, a method comprising:
   detecting an actual bandwidth associated with receiving data from the second data communication device;
   generating a bandwidth metric based on the actual bandwidth associated with receiving the data, the bandwidth metric identifying a proposed data rate for transmitting future data from the second data communication device to the first data communication device; and
   transmitting the bandwidth metric to the second data communication device;
   measuring a round trip time associated with communications between the first data communication device and the second data communication device; and
   setting the bandwidth metric to be a higher value than the actual bandwidth if the measured round trip time is below a threshold value;
   wherein detecting the actual bandwidth includes;
   receiving data from the second data communication device; and
   measuring a rate of receiving the data from the second communication device.

2. A method as in claim 1 further comprising:
   generating the bandwidth metric, which is the proposed data rate for transmitting future data from the second data communication device to the first data communication device, based on the actual bandwidth as well as the round trip time associated with communications between the first data communication device and the second data communication device.

3. A method as in claim 1 further comprising:
   receiving the data from the second data communication device i) in accordance with the proposed data rate identified by the bandwidth metric, and ii) based on use of a non-acknowledgment data transmission protocol.

4. A method as in claim 1 further comprising:
   receiving the data from the second communication device based on use of UDP (User Data Protocol).

5. A method as in claim 1, wherein the first data communication device is a thin client in which a majority of data processing associated with a user at the thin client is performed at the second data communication device, the method further comprising:
   utilizing the data received from the second data communication device to control a human interface device associated with the thin client.

6. A method as in claim 1, wherein generating the bandwidth metric is performed in response to receiving a request for bandwidth allocation received from the second data communication device.

7. A method as in claim 1 further comprising:
   receiving multiple bandwidth allocation requests associated with multiple processes maintained at the second data communication device, the multiple processes generating independent sets of data for transmission to the first data communication device; and
   granting bandwidth, via transmission of multiple bandwidth metrics, to the second data communication device for streaming the independent sets of data associated with the multiple processes from the second data communication device to the first data communication device.

8. A method as in claim 1 further comprising:
in addition to transmitting the bandwidth metric to the second data communication device, providing a unique identifier along with the bandwidth metric for use by the second data communication device to tag the future data transmitted from the second data communication device to the first data communication device.

9. A method as in claim 8 wherein measuring the round trip time associated with communications between the first data communication device and the second data communication device is based at least on part on a time difference between transmitting the bandwidth metric to the second data communication device and receiving a data packet from the second data communication device including the unique identifier; and the method further comprising:
generating the bandwidth metric based on the actual bandwidth as well as the measured round trip time associated with communications between the first data communication device and the second data communication device.

10. A method as in claim 9, wherein measuring the round trip time includes:
measuring a time difference between transmitting a message to notify the second data communication device of the unique identifier and receiving a first data packet from the second data communication device including the unique identifier.

11. A method as in claim 1, wherein
measuring the round trip time includes:
setting the bandwidth metric to be a lower value than the actual bandwidth if the measured round trip time is above a threshold value.

12. A method as in claim 1, wherein generating the bandwidth metric includes;
calculating the bandwidth metric based at least in part on: i) a current measured round trip time associated with communications between the first data communication device and the second data communication device, ii) a previously measured minimum round trip time associated with communications between the first data communication device and the second data communication device, and ii) and a highest measured actual bandwidth associated with data received from the second data communication device.

13. A method as in claim 1, wherein generating the bandwidth metric includes generating the bandwidth metric based on a formula as follows:

$$\text{bandwidth metric} = \frac{(currRTT + minRTT + MSDELAY) * avgbw}{(2 * currRTT)},$$

wherein currRTT=a current measured round trip time associated with communications between the first data communication device and the second data communication device;
wherein minRTT=a previously measured minimum round trip time associated with communications between the first data communication device and the second data communication device during a communication session;
wherein avgbw=a highest previously measured actual bandwidth associated with data received from the second data communication device; and
wherein MSDELAY=C+n*minRTT, where C is a constant and n is an integer.

14. A method as in claim 13, wherein the current measured round trip time and the previously measured round trip time take into account a time associated with the second data communication device i) receiving a first communication from the first data communication device and ii) transmitting a second communication, in response to receiving the first communication, to the first data communication device.

15. A method as in claim 1, wherein detecting the actual bandwidth includes:
monitoring a rate of receiving data from the second data communication device, the data received by the first data communication device being used to drive at least one output device associated with the first data communication device.

16. A method as in claim 1 further comprising:
receiving the future data from the second data communication device based on the proposed data rate.

17. A method as in claim 1 further comprising:
repeating steps of: i) detecting a current bandwidth of receiving data at the first data communication device from the second data communication device and ii) notifying the second data communication device of a proposed bandwidth rate for receiving future data such that the first data communication device receives the future data at a desired bandwidth rate.

18. A method as in claim 1 further comprising:
generating the bandwidth metric based on the actual bandwidth as well as the measured round trip time associated with communication between the first data communication device and the second data communication device.

19. A first data communication device that adaptively allocates bandwidth to a second data communication device for transmitting data over a network susceptible to congestion, the computer system including:
a processor;
a memory unit that stores instructions associated with an application executed by the processor;
a communication interface that supports communication with nodes in the network; and
an interconnect coupling the processor, the memory unit, and the communication interface, enabling the first data communication device to execute the application and perform operations of:
detecting an actual bandwidth associated with receiving data from the second data communication device;
generating a bandwidth metric based on the actual bandwidth associated with receiving the data, the bandwidth metric identifying a proposed data rate for transmitting future data from the second data communication device to the first data communication device; and
transmitting the bandwidth metric to the second data communication device;
calculating the bandwidth metric based at least in part on: i) a current measured round trip time associated with communications between the first data communication device and the second data communication device, ii) a previously measured minimum round trip time associated with communications between the first data communication device and the second data communication device, and iii) a highest measured actual bandwidth associated with data received from the second data communication device;
wherein detecting the actual bandwidth includes;
receiving data from the second data communication device; and
measuring a rate of receiving the data from the second communication device.

20. The first data communication device as in claim 19 further performing an operation of:

identifying a round trip time associated with communications between the first data communication device and the second data communication device;

generating the bandwidth metric based on the actual bandwidth as well as the round trip time associated with communications between the first data communication device and the second data communication device.

21. The first data communication device as in claim 19 further performing an operation of:

receiving the data from the second data communication device i) in accordance with the proposed data rate identified by the bandwidth metric, and ii) based on use of a non-acknowledgment data transmission protocol.

22. The first data communication device as in claim 19 further performing an operation of:

receiving the data from the second communication device based on use of UDP (User Data Protocol).

23. The first data communication device as in claim 19, wherein the first data communication device is a thin client in which a majority of data processing associated with a user at the thin client is performed at the second data communication device, the first data communication device performing an operation of:

utilizing the data received from the second data communication device to control a human interface device associated with the thin client.

24. The first data communication device as in claim 19, wherein the operation of generating the bandwidth metric is performed in response to receiving a request for bandwidth allocation received from the second data communication device.

25. The first data communication device as in claim 19 further performing an operation of:

receiving multiple bandwidth allocation requests associated with multiple processes maintained at the second data communication device, the multiple processes generating independent sets of data for transmission to the first data communication device; and granting bandwidth, via transmission of multiple bandwidth metrics, to the second data communication device for streaming the independent sets of data associated with the multiple processes from the second data communication device to the first data communication device.

26. The first data communication device as in claim 19 further performing an operation of:

in addition to transmitting the bandwidth metric to the second data communication device, providing a unique identifier along with the bandwidth metric for use by the second data communication device to tag the future data transmitted from the second data communication device to the first data communication device.

27. The first data communication device as in claim 26 further performing operations of:

measuring a round trip time associated with communications between the first data communication device and the second data communication device based at least on part on a time difference between transmitting the bandwidth metric to the second data communication device and receiving a data packet from the second data communication device including the unique identifier; and generating the bandwidth metric based on the actual bandwidth as well as the measured round trip time associated with communications between the first data communication device and the second data communication device.

28. The first data communication device as in claim 27, wherein the operation of measuring the round trip time includes:

measuring a time difference between transmitting a message to notify the second data communication device of the unique identifier and receiving a first data packet from the second data communication device including the unique identifier.

29. The first data communication device as in claim 19, wherein the operation of generating the bandwidth metric includes:

measuring a round trip time associated with communications between the first data communication device and the second data communication device; and setting the bandwidth metric to be a higher value than the actual bandwidth if the measured round trip time is below a threshold value.

30. The first data communication device as in claim 19, wherein the operation of generating the bandwidth metric includes:

measuring a round trip time associated with communications between the first data communication device and the second data communication device; and setting the bandwidth metric to be a lower value than the actual bandwidth if the measured round trip time is above a threshold value.

31. The first data communication device as in claim 19, wherein the operation of generating the bandwidth metric includes generating the bandwidth metric based on a formula as follows:

$$\text{bandwidth metric} = \frac{(currRTT + minRTT + MSDELAY) * avgbw}{(2 * currRTT)},$$

wherein $currRTT$=a current measured round trip time associated with communications between the first data communication device and the second data communication device;

wherein $minRTT$=a previously measured minimum round trip time associated with communications between the first data communication device and the second data communication device during a communication session;

wherein $avgbw$=a highest previously measured actual bandwidth associated with data received from the second data communication device; and wherein $MSDELAY=C+n*minRTT$, where C is a constant and n is an integer.

32. The first data communication device as in claim 31, wherein the current measured round trip time and the previously measured round trip time take into account a time associated with the second data communication device i) receiving a first communication from the first data communication device and ii) transmitting a second communication, in response to receiving the first communication, to the first data communication device.

33. At a thin client that receives communications from a server over a network susceptible to congestion, a method for adaptively allocating bandwidth for use by the server to transmit information to the thin client, the method comprising:

receiving a bandwidth request message from the server, the bandwidth request message indicating a request by the server for an allocation of bandwidth to transmit data via a connectionless protocol from the sever to the thin client;

measuring a rate of receiving data form the server;

measuring multiple round trip time values associated with communications between the receiver and the server at different times;

generating a bandwidth limit metric based on: i) a highest average rate of receiving the data from the server over a period of time, and ii) a most recently measured round trip time value associated with communications between the thin client and the server; and transmitting the bandwidth limit metric to the server, the bandwidth limit metric identifying a data rate for transmitting further data from the server to the receiver.

34. A first data communication device that adaptively allocates bandwidth to a second data communication device for transmitting data over a network susceptible to congestion, the computer system including:

a processor;

a memory unit that stores instructions associated with an application executed by the processor;

a communication interface that supports communication with nodes in the network; and an interconnect coupling the processor, the memory unit, and the communication interface, enabling the first data communication device to execute the application and perform operations of:

detecting an actual bandwidth associated with receiving data from the second data communication device;

generating a bandwidth metric based on the actual bandwidth associated with receiving the data, the bandwidth metric identifying a proposed data rate for transmitting future data from the second data communication device to the first data communication device;

transmitting the bandwidth metric to the second data communication device;

in addition to transmitting the bandwidth metric to the second data communication device, providing a unique identifier along with the bandwidth metric for use by the second data communication device to tag the future data transmitted from the second data communication device to the first data communication device;

measuring a round trip time associated with communications between the first data communication device and the second data communication device based at least on part on a time difference between transmitting the bandwidth metric to the second data communication device and receiving a data packet from the second data communication device including the unique identifier, and generating the bandwidth metric based on the actual bandwidth as well as the measured round trip time associated with communications between the first data communication device and the second data communication device.

35. The first data communication device of claim 34 being configured to perform the operation of:

measuring a round trip time associated with communications between the first data communication device and the second data communication device; and comparing a threshold value to the measured round trip time to determine whether to set the bandwidth metric to one of a higher and lower value than that of the actual bandwidth.

36. The first data communication device of claim 35 being configured to perform the operation of:

setting the bandwidth metric to be a higher value than the actual bandwidth if the measured round trip time is below a threshold value;

setting the bandwidth metric to be a lower value than the actual bandwidth if the measured round trip time is above a threshold value.

37. A computer program product including a computer-readable medium having instructions stored thereon for processing data information, such that the instructions, when carried out by a processing device, enable the processing device to perform the steps of:

detecting an actual bandwidth associated with receiving data from the second data communication device;

generating a bandwidth metric based on the actual bandwidth associated with receiving the data, the bandwidth metric identifying a proposed data rate for transmitting future data from the second data communication device to the first data communication device; and transmitting the bandwidth metric to the second data communication device;

measuring a round trip time associated with communications between the first data communication device and the second data communication device; and comparing a threshold value to the measured round trip time to determine whether to set the bandwidth metric to one of a higher and lower value than that of the actual bandwidth.

* * * * *

UNITED STATES PATENT AND TRADEMARK OFFICE
CERTIFICATE OF CORRECTION

PATENT NO. : 7,532,642 B1
APPLICATION NO. : 10/797989
DATED : May 12, 2009
INVENTOR(S) : John Kent Peacock It is certified that error appears in the above-identified patent and that said Letters Patent is hereby corrected as shown below:

Column 17, Line 11, Claim 9:

After "based at least" delete "on" and insert -- in --.

Column 19, Line 61, Claim 27:

After "based at least" delete "on" and insert -- in --.

Column 21, Line 2, Claim 33:

After "protocol from the" delete "sever" and insert -- server --.

Column 21, Line 4, Claim 33:

After "receiving data" delete "form" and insert -- from --.

Column 21, Line 46, Claim 34:

After "based at least" delete "on" and insert -- in --.

Signed and Sealed this

Twenty-eighth Day of July, 2009

JOHN DOLL
*Acting Director of the United States Patent and Trademark Office*